3039X
Sheet 1-2 Sheets
Bullard, Gay & Draper.
Thrashing Mach.
Patented Dec. 16, 1818.
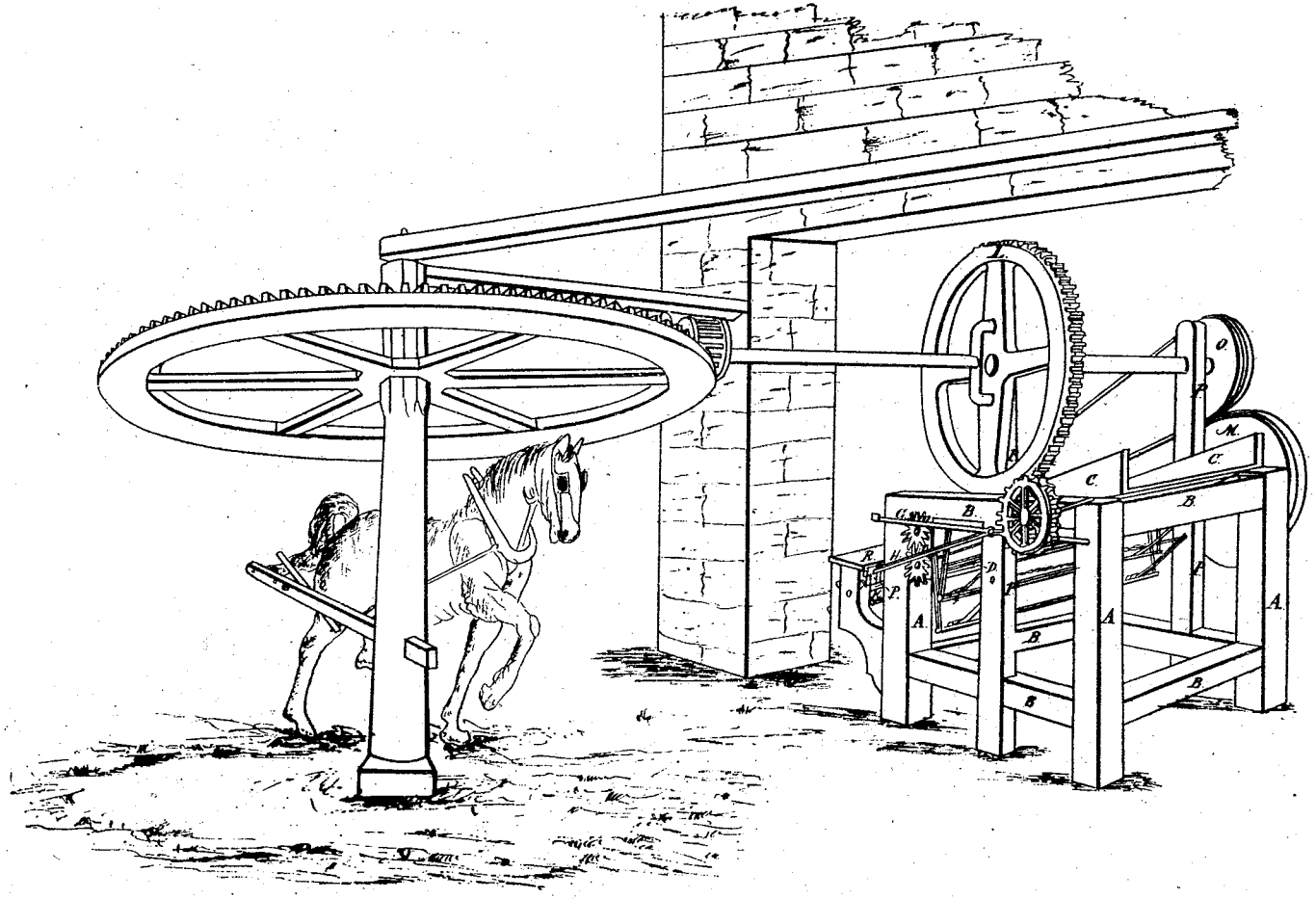

3039X
Sheet 2-2 Sheets
Bullard, Gay & Draper.
Thrashing Mach.
Patented Dec. 16, 1818.
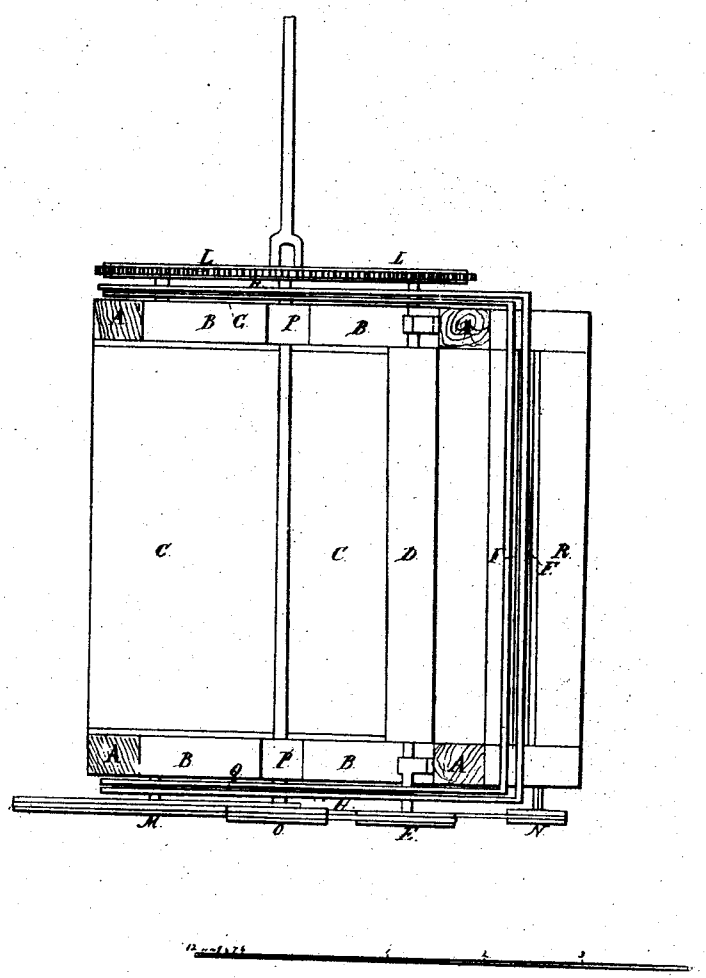
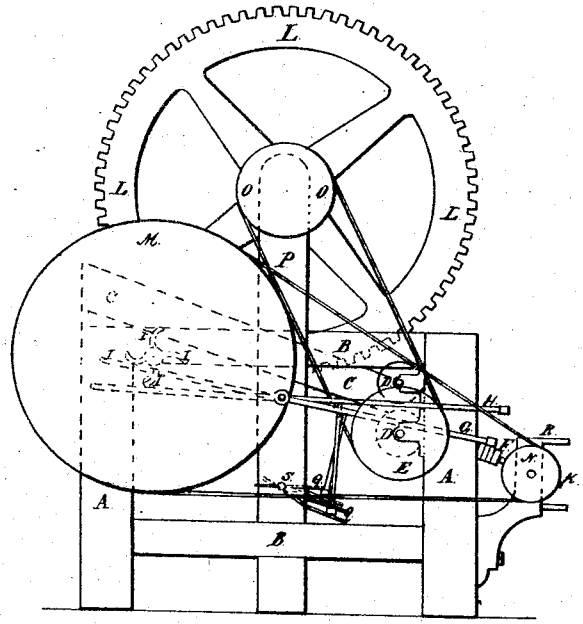

United States Patent Office

PTO - BOYERS, PA Duty Station

MISSING PAGE TEMPORARY NOTICE

PATENT # 3039X FOR ISSUE DATE 12-16-1818

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa